(12) United States Patent
See

(10) Patent No.: US 11,752,661 B2
(45) Date of Patent: Sep. 12, 2023

(54) NATURAL EFFECT PANEL AND METHOD OF FABRICATING THE SAME

(71) Applicant: 5R TECHNOLOGIES SDN. BHD., Muar Johor (MY)

(72) Inventor: Beng Yeaw See, Muar Johor (MY)

(73) Assignee: 5R TECHNOLOGIES SDN. BHD., Muar Johor (MY)

( * ) Notice: Subject to any disclaimer, the term of this patent is extended or adjusted under 35 U.S.C. 154(b) by 0 days.

(21) Appl. No.: 17/042,047

(22) PCT Filed: May 21, 2019

(86) PCT No.: PCT/MY2019/050031
§ 371 (c)(1),
(2) Date: Sep. 25, 2020

(87) PCT Pub. No.: WO2019/226041
PCT Pub. Date: Nov. 28, 2019

(65) Prior Publication Data
US 2021/0069930 A1   Mar. 11, 2021

(30) Foreign Application Priority Data
May 21, 2018   (MY) .......................... UI 2018701959

(51) Int. Cl.
*B27N 3/02*   (2006.01)
*B27N 7/00*   (2006.01)
(Continued)

(52) U.S. Cl.
CPC ............... *B27N 3/02* (2013.01); *B27N 7/005* (2013.01); *B44C 5/043* (2013.01); *B44F 9/04* (2013.01);
(Continued)

(58) Field of Classification Search
CPC .... B27N 3/02; B27N 3/06; B27N 3/20; B32B 21/02; B32B 21/06; B29C 70/34
See application file for complete search history.

(56) References Cited

U.S. PATENT DOCUMENTS 2,583,618 A  *  1/1952  Weyerhaeuser ......... B27N 3/18
264/122
2,918,398 A  *  12/1959  Dorland ................... B27N 3/06
162/132
(Continued)

FOREIGN PATENT DOCUMENTS

CN           120352 A       12/1998
CN         104476965 A       4/2015
(Continued)

*Primary Examiner* — Andrew D Graham

(57) ABSTRACT

A method comprising layering a base layer; depositing a layer of wood particles on the base layer; dispersing the wood particles evenly within a frame; layering a paper sheet; compressing the wood particles with the paper sheets to obtain an enwrapped composite board; layering a kraft paper, a decorative paper and an overlay paper by sequence on the composite board, wherein the kraft paper, the decorative paper and the overlay paper are resin impregnated; and compressing the layered kraft paper, decorative paper and overlay paper to the top and side of the composite board with a carved mould under heat and pressure; thereby forming the natural effect panel that having an irregular surface from top to the side including edge of the panel.

9 Claims, 3 Drawing Sheets

(51) Int. Cl.
*B44C 5/04* (2006.01)
*B44F 9/04* (2006.01)
*B27N 3/08* (2006.01)
*B29C 70/34* (2006.01)
*B31F 1/00* (2006.01)

(52) U.S. Cl.
CPC ............... *B27N 3/08* (2013.01); *B29C 70/34* (2013.01); *B31F 1/007* (2013.01)

(56) References Cited

U.S. PATENT DOCUMENTS

| | | | | |
|---|---|---|---|---|
| 3,188,367 A * | 6/1965 | Gottschalk | | B27N 3/086 264/37.3 |
| 3,226,764 A * | 1/1966 | Hostettler | | B27N 3/22 425/80.1 |
| 3,308,013 A * | 3/1967 | Bryant | | B27N 7/005 162/103 |
| 3,319,814 A * | 5/1967 | Van Elten | | B65G 57/035 414/415 |
| 3,526,558 A * | 9/1970 | Beeson | | B32B 37/00 156/219 |
| 3,558,395 A * | 1/1971 | Plegat | | B44C 5/0469 156/246 |
| 3,594,245 A * | 7/1971 | Hayes | | B27N 3/06 156/62.2 |
| 3,627,864 A * | 12/1971 | Doubleday | | B27N 3/06 264/112 |
| 3,663,341 A * | 5/1972 | Veneziale, Jr. | | B44C 5/0476 428/203 |
| 3,769,143 A * | 10/1973 | Kulesza | | C08L 97/02 428/151 |
| 3,940,528 A * | 2/1976 | Roberts | | A47J 36/04 428/161 |
| 3,996,089 A * | 12/1976 | More | | B29C 70/00 156/235 |
| 4,044,185 A * | 8/1977 | McCaskey, Jr. | | B32B 29/04 428/153 |
| 4,053,339 A * | 10/1977 | Story | | B27N 1/00 427/393 |
| 4,082,828 A * | 4/1978 | Zulli | | B27N 3/08 264/119 |
| 4,084,996 A * | 4/1978 | Wheeler | | B27D 1/08 156/257 |
| 4,119,749 A * | 10/1978 | Roth | | B32B 3/28 428/99 |
| 4,148,857 A * | 4/1979 | Wheeler | | B27N 5/00 144/348 |
| 4,361,612 A * | 11/1982 | Shaner | | B27N 3/06 428/106 |
| 4,505,868 A * | 3/1985 | Krueger | | B27N 3/143 198/382 |
| 4,557,779 A * | 12/1985 | Bower | | B27N 7/00 156/219 |
| 4,743,481 A * | 5/1988 | Quinlan | | B29C 33/123 264/221 |
| 4,789,604 A * | 12/1988 | van der Hoeven | | B44C 5/0476 428/503 |
| 4,865,807 A * | 9/1989 | Petershofer | | A47B 96/202 428/161 |
| 5,064,592 A * | 11/1991 | Ueda | | B27N 7/005 264/112 |
| 5,188,874 A * | 2/1993 | Kauffman | | B29B 15/08 156/163 |
| 5,258,087 A * | 11/1993 | Symons | | B29C 53/385 156/210 |
| 5,354,397 A * | 10/1994 | Miyake | | B29C 45/1418 156/77 |
| 5,397,406 A * | 3/1995 | Vaders | | B27M 3/0093 156/219 |
| 5,648,138 A * | 7/1997 | Tingley | | B29C 70/025 428/105 |
| 5,665,295 A * | 9/1997 | Takamoto | | B29B 15/122 264/172.19 |
| 5,695,875 A * | 12/1997 | Larsson | | B27N 3/02 428/326 |
| 5,707,472 A * | 1/1998 | Smith | | B29C 37/0025 156/231 |
| 5,733,624 A * | 3/1998 | Syme | | B05C 5/0279 428/68 |
| 5,868,890 A * | 2/1999 | Fredrick | | B29C 70/46 156/214 |
| 6,042,911 A * | 3/2000 | Berdan, II | | B32B 5/26 428/36.3 |
| 6,153,144 A * | 11/2000 | Byma | | B27N 3/02 264/113 |
| 6,204,312 B1 * | 3/2001 | Taylor | | B27N 3/00 524/13 |
| 6,465,046 B1 * | 10/2002 | Hansson | | B32B 38/145 427/256 |
| 6,571,840 B1 | 6/2003 | Atkins et al. | | |
| 6,737,155 B1 * | 5/2004 | Ou | | B27N 3/06 428/105 |
| 6,773,799 B1 * | 8/2004 | Persson | | B27N 3/26 428/323 |
| 7,060,158 B2 * | 6/2006 | Sjoberg | | B32B 38/1841 156/269 |
| 7,640,664 B1 * | 1/2010 | Bailey | | B27N 3/04 29/897.32 |
| 7,781,052 B2 * | 8/2010 | Matsufuji | | B27N 3/02 428/292.4 |
| 8,480,841 B2 * | 7/2013 | Pervan | | B05D 7/06 156/279 |
| 8,499,519 B2 * | 8/2013 | Meersseman | | B44F 9/02 52/390 |
| 8,591,696 B2 * | 11/2013 | Smith | | B44C 5/0476 156/307.4 |
| 9,085,905 B2 * | 7/2015 | Persson | | B32B 21/042 |
| 9,352,499 B2 * | 5/2016 | Ziegler | | B27N 1/00 |
| 9,441,380 B2 * | 9/2016 | Dohring | | G10K 11/168 |
| 9,695,600 B2 * | 7/2017 | Vandevoorde | | B32B 15/14 |
| 10,260,232 B1 * | 4/2019 | Conboy | | B27K 3/52 |
| 10,315,219 B2 * | 6/2019 | Jacobsson | | B32B 37/24 |
| 2002/0005229 A1 * | 1/2002 | Johnson | | B32B 21/06 144/346 |
| 2002/0155279 A1 * | 10/2002 | Dai | | B27N 7/005 428/335 |
| 2003/0136494 A1 * | 7/2003 | Windmoller | | B44C 5/0484 156/62.2 |
| 2003/0159389 A1 * | 8/2003 | Kornfalt | | D21H 27/28 52/396.04 |
| 2004/0067334 A1 * | 4/2004 | Sean | | B32B 21/02 428/109 |
| 2004/0075988 A1 * | 4/2004 | Tatsumi | | B32B 37/26 361/748 |
| 2004/0086678 A1 * | 5/2004 | Chen | | B44C 5/0461 428/44 |
| 2004/0255541 A1 * | 12/2004 | Thiers | | B32B 27/04 52/578 |
| 2005/0076598 A1 * | 4/2005 | Lewark | | E04F 15/02 52/591.4 |
| 2005/0170147 A1 * | 8/2005 | Bacon | | B29C 70/24 428/172 |
| 2005/0217193 A1 * | 10/2005 | Kornfalt | | E04F 19/062 52/395 |
| 2006/0130421 A1 * | 6/2006 | Nollet | | B44C 5/04 52/582.1 |
| 2006/0177633 A1 * | 8/2006 | Han | | B44C 5/0492 428/156 |
| 2007/0071942 A1 * | 3/2007 | Callaway | | B32B 5/024 428/95 |
| 2007/0107839 A1 * | 5/2007 | Sjoberg | | B32B 21/06 156/307.7 |
| 2007/0175041 A1 * | 8/2007 | Hardwick | | B27N 3/00 29/897.3 |
| 2007/0225443 A1 * | 9/2007 | Skelskey | | C08F 222/1065 525/107 |

(56) References Cited

U.S. PATENT DOCUMENTS

| | | | | |
|---|---|---|---|---|
| 2008/0261014 A1* | 10/2008 | McGuire | B29C 51/28 | 428/297.1 |
| 2009/0029102 A1* | 1/2009 | McCulloch | B32B 37/24 | 428/114 |
| 2009/0042019 A1* | 2/2009 | Nilsson | B27N 3/02 | 428/326 |
| 2009/0145066 A1* | 6/2009 | Pervan | B32B 7/12 | 52/309.15 |
| 2010/0062248 A1* | 3/2010 | Kimura | B27N 3/02 | 428/338 |
| 2010/0092731 A1* | 4/2010 | Pervan | B27M 3/04 | 428/172 |
| 2010/0112285 A1* | 5/2010 | Decoene | B44C 5/04 | 428/141 |
| 2010/0203289 A1* | 8/2010 | Haenel | B27N 3/12 | 428/143 |
| 2010/0291819 A1* | 11/2010 | Kirchner | B29C 70/00 | 442/64 |
| 2010/0300030 A1* | 12/2010 | Pervan | B32B 5/26 | 52/588.1 |
| 2013/0213550 A1* | 8/2013 | Berlin | B29C 70/34 | 156/62.2 |
| 2014/0162031 A1* | 6/2014 | Griffin, Jr. | B44C 5/0469 | 428/195.1 |
| 2015/0017461 A1* | 1/2015 | Lindgren | B27N 3/002 | 428/528 |
| 2015/0056416 A1* | 2/2015 | Maesen | B44C 5/04 | 428/172 |
| 2015/0101509 A1* | 4/2015 | McIntyre | C08L 97/02 | 106/124.1 |
| 2015/0197942 A1* | 7/2015 | Pervan | B32B 37/18 | 428/136 |
| 2015/0298441 A1* | 10/2015 | Berthold | E04C 2/292 | 428/191 |
| 2016/0144433 A1* | 5/2016 | Stoffel | B22F 10/20 | 425/471 |
| 2017/0129206 A1* | 5/2017 | Yoshida | B29D 7/00 | |
| 2017/0361489 A1* | 12/2017 | Weinkotz | B27N 3/005 | |
| 2018/0126584 A1* | 5/2018 | Ritter | B27N 3/02 | |
| 2018/0370278 A1* | 12/2018 | Persson | B32B 7/12 | |
| 2019/0224929 A1* | 7/2019 | Oulanti | B29C 70/46 | |
| 2019/0263102 A1* | 8/2019 | Lemieux | B32B 5/18 | |
| 2019/0283345 A1* | 9/2019 | Uesaka | C08J 5/24 | |
| 2019/0292793 A1* | 9/2019 | Van Vlassenrode | B32B 27/32 | |

FOREIGN PATENT DOCUMENTS

| | | |
|---|---|---|
| JP | 2002-326319 A | 11/2002 |
| WO | WO 1999/017930 A1 | 4/1999 |
| WO | WO 2012/009528 A1 | 1/2012 |

* cited by examiner

NATURAL EFFECT PANEL AND METHOD OF FABRICATING THE SAME

TECHNICAL FIELD

This invention generally relates to a furniture and more particularly to a natural effect panel of a furniture that comprises a layer of high pressure laminate having an irregular surface that form across top to the side including edge of the panel to create the natural effect as a whole.

BACKGROUND ART

During the years, furniture production has improved from the basic use structure to the advancement of design to meet the expectation of users in terms of comfortability, appearance and even the touching effect. Some of the examples are discussed below.

CN104476965A discloses a furniture surface embossing character production process. The process comprises of writing the required character writing on a furniture surface material, adopting a tool to outline the character, adopting a second tool to form the character by using the convolution manner and the direct embossing manner according to morphology of the character, and finally covering the character by coating a layer of color paint. Said embossing process meant for character writing, by manually engraves on the surface of the furniture, wherein the character writing protrudes from the surface of the furniture.

CN1203052A is another example of a moulded carved furniture features that each part of the furniture is composed of core made up by high-temperature, high-pressure die pressing and thin wood boards on the surface of core. The process of producing the moulded carved furniture comprises of: preparing raw materials, drying, crushing, mixing with binder, high-temperature high-pressure die pressing, sticking thin wood boards, die pressing again, cooling, grinding, fine working, assembling, painting and packaging. The carved pattern is made on the thin wood that produces a full grade of wood.

U.S. Pat. No. 6,571,840B1 discloses a composite furniture ornamentation where a two-color silk screened image on a solid wood substrate, and a CNC-carved indentation in the substrate which provides a relief effect located in reference to the printed image that makes the substrate look antique. Said ornamenting process requires an automatic carving machine with coordination orientated which is costly.

Despite of the aforementioned ornamentation techniques, the selection of materials to be carved does play a role in producing a good quality furniture. High Pressure Laminate (HPL) or thermoset laminate is a commercially available decorative laminate which is made from resin-impregnated paper. More particularly, the HPL is produced by saturating multiple layers with phenolic resin, following by undergoing a high pressure compression to make it a strong and sturdy surface material. Besides of that, HPL is also resistant to burning, UV rays, stains, heat and scratches. Yet, it is easy to clean and it requires a minimum of maintenance.

The long-lasting laminate is a common choice as laminate on a composite panel, i.e. display, cabinet or furniture. In one of the application, the HPL is used as the cover paper of table tops for aesthetic attributes. On top of that, the lamination with HPL can improve the physical performance of the composite panel. Particularly, it improves the life-span of the composite panel. Therefore, it attracts effort in improving printing pattern on the decorative layer of high pressure laminate while optimising it's use. The market available HPL mainly focuses on the top surface design which lacks of natural effect to the panel in term of appearance. Moreover, a ready form HPL is sturdy, thus making it difficult to modify or add-on features once the laminate layer is formed.

Accordingly, it can be seen in the prior arts that there exists a need to provide an improved quality laminate with aesthetic value and natural effect that resemble appearance of an actual material so as to replace the use of actual material yet meeting beyond the expectation of consumers and remaining the excellence quality.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

An object of the present invention to provide a furniture comprises a natural effect panel having an irregular surface.

It is also an object of the present invention to provide a natural effect panel comprising an irregular surface across top to side including edge of the panel which gives a real look in terms of visual and touching effect.

It is yet another object of the present invention to provide a natural effect panel that imitates a natural stone made, marble made or concrete made furniture.

It is a further object of the present invention to provide a natural effect panel that can replace the use of actual material such as stone, marble or concrete in making a furniture.

It is also a further object of the present invention to provide a natural effect panel comprising a layer of high pressure laminate having an irregular surface.

It is a further object of the present invention to provide a method pf fabricating the natural effect panel.

Accordingly, these objectives may be achieved by following the teachings of the present invention. The present invention relates to a natural effect panel of a furniture and a method of fabricating thereof. The panel comprising: a composite board with a high pressure laminate covering the composite board; wherein the high pressure laminate having an irregular surface that forms on top and side of the panel. The irregular surface provides an appearance that imitate a natural stone, marble or concrete. The method comprising the steps of: layering a base layer; depositing a layer of wood particles on the base layer; dispersing the wood particles evenly within a frame; layering a paper sheet; compressing the wood particles with the paper sheets to obtain an enwrapped composite board; layering a kraft paper, a decorative paper and an overlay paper by sequence on the composite board, wherein the kraft paper, the decorative paper and the overlay paper are resin impregnated; characterized by compressing the layered kraft paper, decorative paper and overlay paper to the top and side of the composite board with a carved mould under heat and pressure; thereby forming a natural effect panel having an irregular surface from top to side of the panel (100).

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
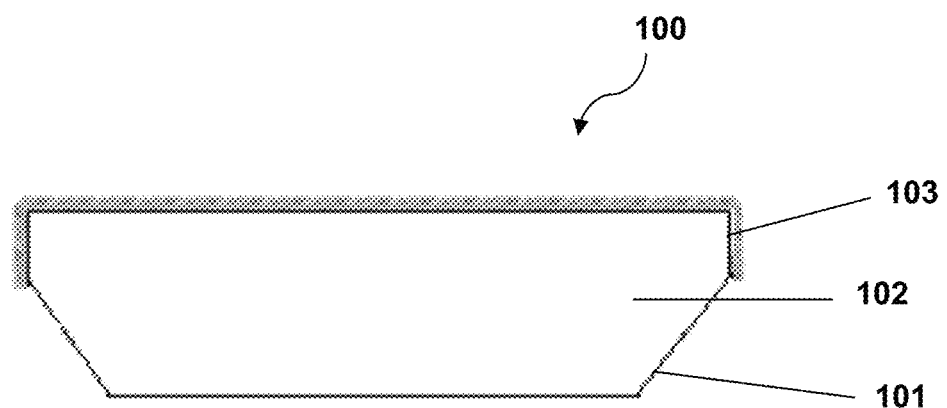
FIG. 1 is a cross-section view of a natural effect panel in accordance to a preferred embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field. For ease of reference, common reference numerals will be used throughout the figures when referring to the same or similar features common to the figures. The present invention will now be described with reference to FIGS. 1-4.

The present invention discloses an improvement of a furniture panel and the production of the panel which adds ornamentation value and natural effect. Said panel can be used for furniture such as tabletop and the like. More particularly, the present invention relates to a method of fabricating a natural effect panel (200), the method comprising the steps of:

layering a resin impregnated paper sheet (101) as a base layer;

depositing a layer of wood particles (102) on the base layer;

dispersing the wood particles (102) evenly within a frame;

layering a paper sheet (103) on the wood particles (102);

compressing the wood particles (102) with the paper sheets (101, 103) to obtain an enwrapped composite board;

layering a kraft paper (104), a decorative paper (105) and an overlay paper (106) by sequence on the composite board, wherein the kraft paper (104), the decorative paper (105) and the overlay paper (106) are resin impregnated;

characterized by compressing the layered kraft paper (104), decorative paper (105) and overlay paper (106) to the top and side of the composite board with a carved mould under heat and pressure, thereby forming a natural effect panel (100) that having an irregular surface from top to the side including edge of the panel (100).

Figure 2:
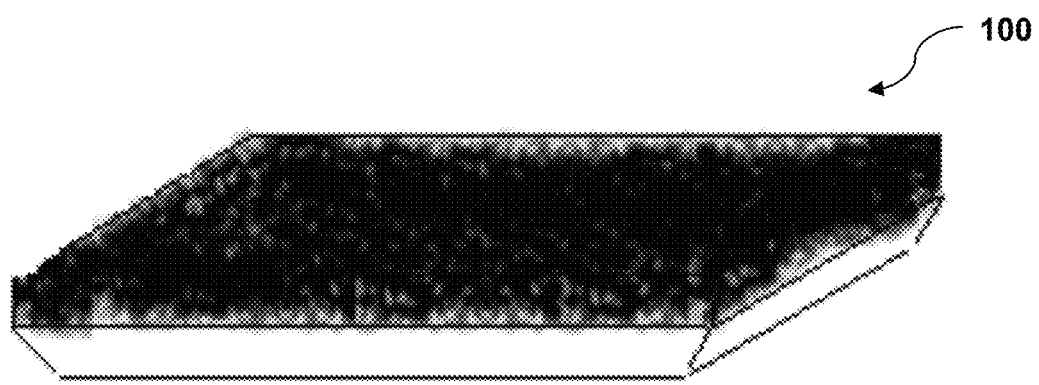
FIG. 2 is a perspective view of the natural effect panel.

FIG. 1 and FIG. 2 illustrate the natural effect panel (100) of the present invention, wherein the natural effect panel (100) comprises an irregular surface that form on top and side including edge of the panel (100). More particularly, the irregular surface covers top surface of the composite board and extends to side including edge of the composite board, thereby creating a natural effect that imitates a natural stone, marble or concrete that use to produce a tabletop or countertop of furniture.

In a preferred embodiment of the natural effect panel (100), the irregular surface comprises a plurality of indentations uniformly form on the surface of the natural effect panel (100). The three layers including the kraft paper (104), the decorative paper (105) and the overlay paper (106) form a high pressure laminate (HPL). Each paper possesses different properties and functions which are known in the industry. In accordance to the present invention, the plurality of indentations is uniformly formed during fabrication process to form the irregular surface, thereby creating a natural effect that imitate natural stone, marble or concrete made furniture. Moreover, the irregular surface is not limited to the top of the panel but extended to the side of the panel including edge as in the present invention. Said formation of irregular surface at side panel is only achievable during formation of the laminate layer by simultaneously in a single step, which is compression by a carved mould. As such, said natural effect panel (100) may use as a replacement to the actual material which is heavy in nature.

In a preferred embodiment of the natural effect panel (100), the carving of indentations is formed by a carved mould during the step of compressing the layered kraft paper (104), decorative paper (105) and overlay paper (106), wherein these papers form a layer of high pressure laminate. The mould encloses the composite board layered with the three papers on the top and the side, thus forming the irregular surface on top and side including edge of the panel (100) that improves the natural effect of the panel (100) as a whole, not only on the top surface but also to the side including edge at the angle of the panel.

In a preferred embodiment of the natural effect panel (100), the composite board comprises a resin impregnated paper sheet (101), a layer of wood particles (102), and a paper sheet (103). The resin impregnated paper sheet (101) may be a kraft paper impregnated with resin. The wood particles (102) may be saw dust particles or the like. The paper sheet (103) may be any paper having pores and without resin or coating. The pores of the paper sheet (103) allows the paper sheet (103) to be breathable during compression, thereby reducing the crack of the paper that may be caused by the pressure during compression.

In a preferred embodiment of the natural effect panel (100), the carving is formed on the top and side of the panel (100), wherein equal pressure is applied towards the top and side of the panel (100) to obtain a uniform carving pattern.

Figure 3:
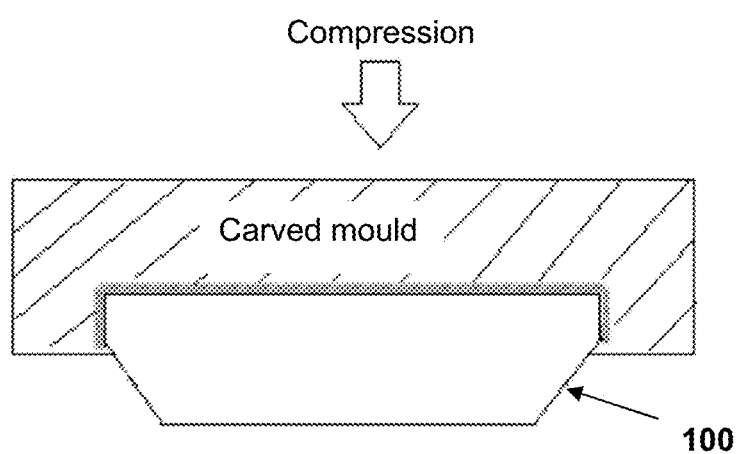
FIG. 3 is diagram illustrating a compression of a carved mould onto top and side including edge of the panel.

FIG. 3 illustrates the moulding to carve the natural effect panel (100). As seen, the mould comprises protrusions that creates the indentations on top and side of the natural effect panel (100) by pressing the mould towards the high pressure laminate layer of the panel (100).

In accordance to a preferred embodiment of the method (200) of fabricating the natural effect panel (100), a single pressing and moulding machine may be used to form the panel (100). Heat and pressure are applied during the compression to form the high pressure laminate layer onto the composite board while carving the surface of the layer.

In a preferred embodiment of the method (200) of fabricating the natural effect panel (100), both laminating and carving are performed in a single step during compression.

In a preferred embodiment of the method (200) of fabricating the natural effect panel (100), both compression steps are performed under high temperature of 18° C.

Figure 4:
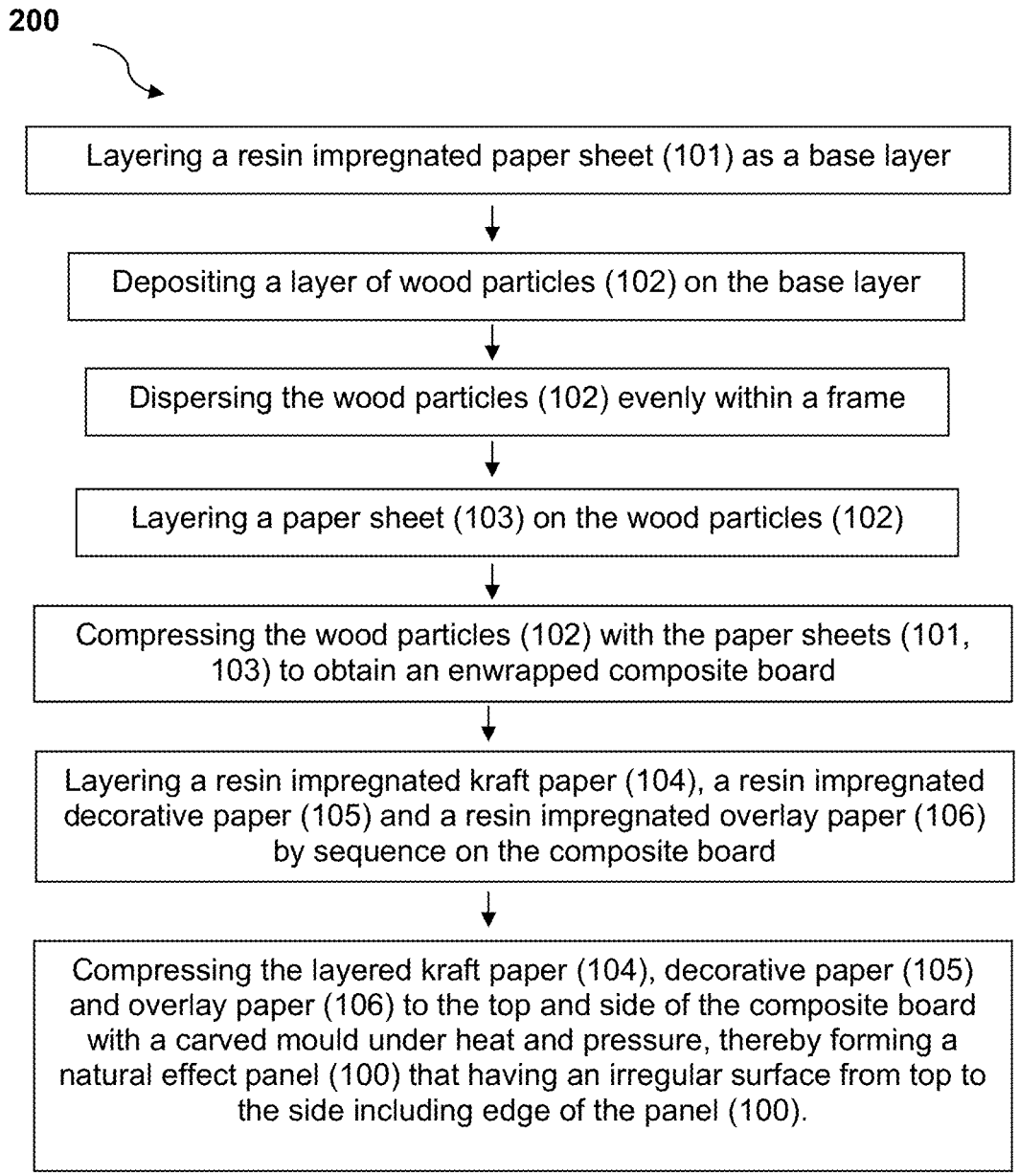
FIG. 4 is a flow chart showing a method of fabricating the natural effect panel according to an embodiment of the present invention.

FIG. 4 illustrates a flowchart of the method for fabricating the natural effect panel (100). The natural effect panel (100) as produced by the same method does meet the requirement for formaldehyde concentration in air from wood products using a small scale chamber of ASTM D6007-14; ISO 4892-3: 2006; BS EN 12720:2009+A1: 2013 Furniture Assessment of surface resistance to cold liquids; BS EN 12721: Resistance to wet heat; BS EN 12722: Resistance to dry heat; CPSD-HL-01055-MTHD: Surface Scratching. Further assessment has been tested including swelling in thickness after immersion in water and boil test which resulting 0.5% and 8.9% of original thickness of swelling after immersion in water and boiling water, while 53.5% change in weight for water absorption of boil test.

The above natural effect panel (100) improves quality of a panel in the aspect of physical appearance which the panel (100) possesses an appearance that resemble stone, marble or concrete made panel. It gives the same feeling by touching the surface of the panel (100). Hence, said natural effect panel can replace the use of actual material including stone, marble or concrete, resulting an eco-friendly product by reducing reliance on natural resources that is non-renewable.

Although the present invention has been described with reference to specific embodiments, also shown in the appended figures, it will be apparent for those skilled in the art that many variations and modifications can be done within the scope of the invention as described in the specification and defined in the following claims.

Description of the reference numerals used in the accompanying drawings according to the present invention:

| Reference Numerals | Description |
| --- | --- |
| 100 | Natural effect panel |
| 101 | Resin impregnated paper sheet |
| 102 | Wood particles |
| 103 | Paper sheet |
| 104 | Kraft paper |
| 105 | Decorative paper |
| 106 | Overlay paper |
| 200 | Method of fabricating the natural effect panel |

The invention claimed is:

1. A method of fabricating a natural effect panel (100), the method comprising the steps of:
   layering a resin impregnated paper sheet (101) as a base layer;
   depositing a layer of wood particles (102) on the base layer;
   dispersing the wood particles (102) evenly within a frame;
   layering a paper sheet (103) on the wood particles (102);
   compressing the wood particles (102) with the paper sheets (101, 103) to obtain an enwrapped composite board;
   layering a kraft paper (104), a decorative paper (105) and an overlay paper (106) by sequence on the enwrapped composite board, wherein the kraft paper (104), the decorative paper (105) and the overlay paper (106) are resin impregnated; and
   compressing the layered kraft paper (104), decorative paper (105) and overlay paper (106) onto a top surface of the enwrapped composite board and lateral surfaces of the enwrapped composite board with a carved mould under heat and pressure, wherein the carved mould comprises protrusions configured to form the natural effect panel (100) having an irregular surface, the irregular surface covering the top surface of the enwrapped composite board and extending from an upper edge of the enwrapped composite board to the lateral surfaces of the enwrapped composite board.

2. The method as claimed in claim 1, wherein said irregular surface comprises a plurality of indentations uniformly formed thereon.

3. The method as claimed in claim 1, wherein said kraft paper (104), decorative paper (105) and overlay paper (106) are layered to form a high pressure laminate.

4. The method as claimed in claim 1, wherein the resin impregnated paper sheet (101) is a kraft paper impregnated with resin.

5. The method as claimed in claim 1, wherein said wood particles (102) comprises saw dust particles.

6. The method as claimed in claim 1, wherein said paper sheet (103) is a paper having pores and without resin or coating.

7. The method as claimed in claim 1, wherein an equal pressure is applied towards the top surface of the enwrapped composite board and the lateral surfaces of the enwrapped composite board when compressing the layered kraft paper, the decorative paper and the overlay paper to obtain a uniform carving pattern.

8. The method as claimed in claim 1, wherein the step of compressing the layered kraft paper, the decorative paper and the overlay paper is performed at temperature of 180° C.

9. The method as claimed in claim 3, wherein the step of compressing leads to formation of the high pressure laminate and said irregular surface of said natural effect panel (100).

* * * * *